Figure 1:
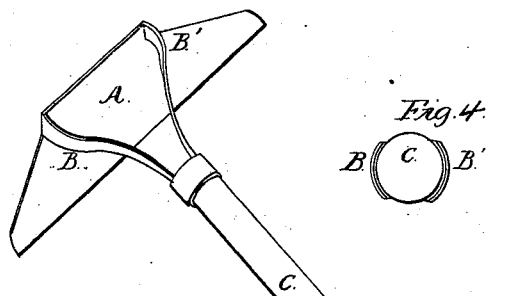
Figure 4:
Figure 3:
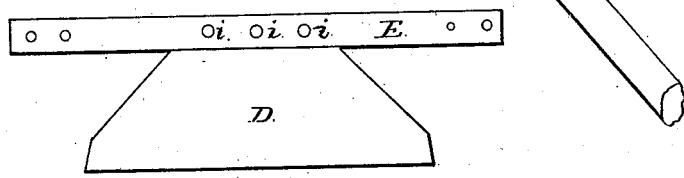
Figure 2:
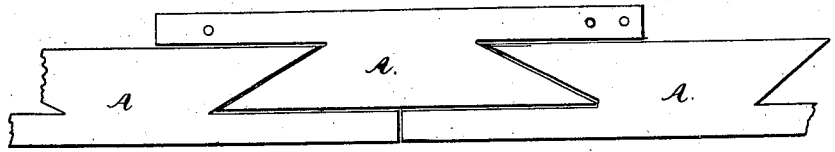
Figure 5:
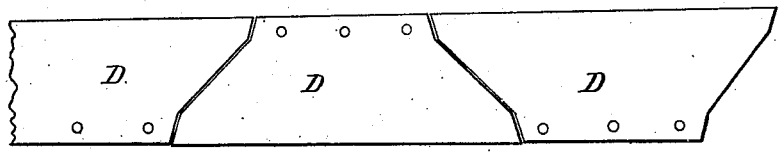

A. Prentiss.

Making Hoes.

Nº 64,792. Patented May 14, 1867.

Witnesses.

Inventor.
Arthur Prentiss.

United States Patent Office.

ARTHUR PRENTISS, OF PRENTISS VALE, PENNSYLVANIA.

Letters Patent No. 64,792, dated May 14, 1867.

IMPROVED HOE.

The Schedule referred to in these Letters Patent and making part of the same.

TO ALL WHOM IT MAY CONCERN:

Be it known that I, ARTHUR PRENTISS, of Prentiss Vale, McKean county, State of Pennsylvania, have invented certain new and useful improvements in the manufacture of Hand-Hoes for farm and garden use; and I do hereby declare the following to be a full and exact description of the same, reference being had to the drawings that accompany and form a part of these specifications, in which—

Figure I is a view of the hoe with a portion of the handle.

Figure II, view showing the manner of cutting the hoe-plate and straps that attach to the handle from plate steel.

Figure III, view of hoe-plate cut by itself and riveted to a strap, which is also cut by itself.

Figure V, view showing method of taking from the plane steel plate the hoe-blades for the second style of hoes, or that shown in Fig. III.

Letter A, hoe-plate.

Letter B B', straps cut on the same piece of steel with the hoe-plate, and being fashioned substantially as shown in Fig. I, afford sufficient strength, and yet allow of an elasticity that is most desirable in a hand-hoe.

Letter C, the handle, which may be of uniform size throughout, or varied in any way to suit the taste or desire of the manufacturer or user.

Letter D, blade cut by itself, without the straps B B'.

Letter E, strap, of uniform width, riveted on to the plate D at $iii$.

The object of my invention is to provide a light and yet strong hoe for garden or field use, to lessen the amount of manual labor required in the manufacture, and to reduce the amount of waste in stock.

An examination of Fig. II will show how the hoes that are made with the straps B B' may be cut from plate steel without wasting stock.

Figure V shows how the hoe-plates D D are cut from plate steel without losing stock, after which the straps E are riveted on, as shown in Fig. III.

The straps B B', as also the straps E, should not only be curved, as shown in Fig. I, but they should be fashioned as indicated in Figure IV, which is a sectional view of two of the straps, showing them to be bent so as to fit to the cylindrical form of the handle and the ferrule, and this form continued nearly to the blade of the hoe gives great strength for the amount of material used.

A noticeable feature of my hoe is great strength with extreme lightness. Another important feature is the two straps B B', spread out from the handle, and connected with the hoe-plate at points so distant that they not only brace it and give it strength, but prevent the handle from turning so readily in the hand as ordinary hoes.

What I claim as my invention, and desire to secure by Letters Patent, is—

As a new article of manufacture, a hoe for garden or other use, cut, formed, and otherwise constructed as described and shown.

ARTHUR PRENTISS.

Witnesses:
D. C. COLBY,
CHAS. F. WILSON.